(12) United States Patent
Moriki et al.

(10) Patent No.: US 7,663,336 B2
(45) Date of Patent: Feb. 16, 2010

(54) CONTROL APPARATUS FOR VEHICLE

(75) Inventors: Hidekazu Moriki, Hitachinaka (JP); Shinya Imura, Toride (JP); Norikazu Matsuzaki, Mito (JP); Kohei Itoh, Hitachiota (JP); Masaru Ito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 222 days.

(21) Appl. No.: 11/836,562

(22) Filed: Aug. 9, 2007

(65) Prior Publication Data
US 2008/0056687 A1 Mar. 6, 2008

(30) Foreign Application Priority Data
Aug. 31, 2006 (JP) ............... 2006-236272

(51) Int. Cl.
*H02P 27/04* (2006.01)
(52) U.S. Cl. .................. 318/801; 318/139; 318/63
(58) Field of Classification Search ............ 388/801; 318/139, 63, 65, 801, 800, 440, 140, 154, 318/158, 52; 180/242
See application file for complete search history.

(56) References Cited

U.S. PATENT DOCUMENTS

| 3,764,867 | A | 10/1973 | Smith |
| 6,031,965 | A | 2/2000 | Hammer et al. |
| 6,427,104 | B1 | 7/2002 | Matsushita et al. |
| 2002/0005304 | A1 | 1/2002 | Bachman et al. |
| 2004/0040375 | A1* | 3/2004 | Kadota et al. .............. 73/116 |
| 2005/0150702 | A1 | 7/2005 | Matsuzaki |

FOREIGN PATENT DOCUMENTS

| EP | 0 080 278 A1 | 6/1983 |
| GB | 1 210 721 | 10/1970 |
| JP | 3594004 B2 | 9/2004 |
| JP | 3594024 B2 | 9/2004 |
| JP | 3610972 B2 | 10/2004 |
| JP | 2005-186756 A | 7/2005 |
| WO | WO 99/17436 A1 | 4/1999 |

OTHER PUBLICATIONS

European Search Report dated Oct. 5, 2007 (nine (9) pages).

* cited by examiner

*Primary Examiner*—Karen Masih
(74) *Attorney, Agent, or Firm*—Crowell & Moring LLP (57) ABSTRACT

In a control apparatus for a vehicle having an electric motor for driving the wheels of the vehicle, an electric power source for energizing the electric motor, a motor torque target value calculation unit for controlling the electric power source, and a field current target value calculation unit, the motor field current is momentarily decreased when the difference between the actual motor armature current and the motor armature current target value exceeds a predetermined value or when the wheels are deemed to slip, and the motor field current is increased as the actual armature current of the motor substantially follows the motor armature current target value.

10 Claims, 9 Drawing Sheets

| JUDGMENT | CONDITION |
|---|---|
| GENERATION DELAY JUDGMENT | Iat−Ia≥t_Iat1 and Igt≤t_Igt1 |
| GENERATION LIMIT JUDGMENT | GHV_d≤t_GHV_d or (Iat−Ia≥t_Iat2 and Igt≥t_Igt2) |
| GENERATION RECOVERY JUDGMENT | Iat−Ia≤t_Iat3 |
| GENERATION PROPERNESS JUDGMENT | Ia≥Iat and Ift≥Ift1 |
| GENERATION INSUFFICIENCY JUDGMENT | Ia−Iat≤t_Iat4 |
| GENERATION EXCESS JUDGMENT | Ia−Iat≥t_Iat5 |
| FIELD CURRENT RECOVERY JUDGMENT | Ift≥Ift1 and R_SLIP=0 |

FIG.10

CONTROL APPARATUS FOR VEHICLE

BACKGROUND OF THE INVENTION

This invention relates to a control apparatus for a vehicle having an electric motor for driving the wheels of the vehicle and an electric power supply for energizing the electric motor, and more particularly to the control of the motor field current of the electric motor.

Japanese patent documents such as JP-A-2005-186756, Japanese Patent No. 3610972, and Japanese Patent No. 3594024, disclose conventional procedures for controlling the motor field current in an electric motor, the procedure being used for a control apparatus comprising an electric motor for driving the wheels of a vehicle, a motor field current control unit for controlling the motor field current in the motor, an electric power supply for energizing the electric motor, and a power control unit for controlling the power supplied to the electric motor.

The document JP-A-2005-186756 discloses a procedure wherein the back electromotive force induced in the electric motor is suppressed to yield a sufficient torque at high revolution speed operations through the "weak field control" that the field current of the motor is gradually decreased as the revolution speed of the motor increases exceeding a predetermined threshold value.

The Japanese Patent No. 3610972 teaches a procedure wherein the motor field current in the motor is decreasingly corrected so as to decrease the back electromotive force generated in the motor when the generator is deemed to generate insufficient power due to the change in transmission gear ratio, so that power generation in the generator is recovered and the required torque can be generated.

According to the document Japanese Patent No. 3594024, the motor field current in the motor is decreased in accordance with the decrease in the motor torque; the rate of decreasing the motor field current is increased for smaller limit of power generation; and therefore the back electromotive force induced in the motor is suppressed so that an effective voltage can be obtained to produce current for obtaining a target motor torque.

SUMMARY OF THE INVENTION

However, the document JP-A-2005-186756 only considers the increase in the back electromotive force due to the increase in the revolution speed of the motor, and ignores the insufficiency of power generation. A problem, therefore, arises that a desired motor torque cannot be obtained due to the insufficiency of power generation.

On the other hand, according to the Japanese Patent No. 3610972 and Japanese Patent No. 3594024, the back electromotive force of the motor is lowered depending only on the insufficiency of power generation, but the heat generation in the motor is not considered. Consequently, the back electromagnetic force of the motor remains low even when the power generation is recovered. As a result, large armature current continues to flow for a certain period of time so that the motor is heated. And the worst result would be that the motor is broken.

Moreover, none of the documents JP-A-2005-186756, Japanese Patent No. 3610972, and Japanese Patent No. 3594024 mention the delay of change in power generation. Without a countermeasure for coping with the delay of change in power generation, a problem would arise that when the wheels driven by the motor slip, the moment to start decreasing the motor torque is delayed so that the slip cannot be quickly suppressed. Further, there would be a problem that the motor torque falls low momentarily when the power generation becomes insufficient momentarily due to the depression in the revolution speed of the generator at the time of speed change.

The object of this invention is to provide a control apparatus which can quickly generate a desired torque while suppressing the heat generation in the motor to the minimum.

According to this invention, which has been made to solve the above mentioned problems, there is provided as a first embodiment a control apparatus for a vehicle, comprising an electric motor for driving the wheels of the vehicle, an electric power supply for energizing the electric motor, and a control unit consisting mainly of a motor torque target value calculation unit for controlling the electric power supply that energizes the electric motor and a motor field current target value calculation unit for calculating a target value for the motor field current of the electric motor, wherein the control unit momentarily decreases the field current of the electric motor when the difference between the actual armature current of the electric motor and the target value for the motor armature current exceeds a predetermined value, while when the actual armature current roughly follows its target value, the motor field current is increased.

According to this invention, there is provided as a second embodiment, a control apparatus for a vehicle, comprising an electric motor for driving the wheels of the vehicle, an electric power supply for energizing the electric motor and a control unit consisting mainly of a motor torque target value calculation unit for controlling an electric power supply that energizes the electric motor and a motor field current target value calculation unit for calculating a target value for the motor field current of the electric motor, wherein the control unit momentarily decreases the motor field current of the electric motor when the wheels of the vehicle are found to slip, while when the actual armature current roughly follows its target value, the motor field current is increased.

According to this invention, there is provided as a third embodiment a control apparatus for a vehicle as mentioned above as the first embodiment of this invention, wherein the motor field current target value calculation unit incorporates therein a motor current target value calculation unit; and the motor current target value calculation unit comprises plural units for outputting different target values for the motor field current, a motor field current control mode judgment unit and a motor field current target value switching unit; and wherein the motor field current target value switching unit selects one of the different motor field current target values in response to the output of the motor field current control mode judgment unit.

According to this invention, there is provided as a fourth embodiment a control apparatus for a vehicle as mentioned above as the third embodiment of this invention, wherein the plural units output plural target values for the motor field current of the motor on the basis of the inputs selected from among the revolution speed of the motor, the motor armature current, the motor torque target value, the supplied voltage and the previous target value for the motor field current.

According to this invention, there is provided as a fifth embodiment a control apparatus for a vehicle as mentioned above as the third embodiment of this invention, wherein the plural units comprises a first output unit for outputting a first motor field current target value depending on the revolution speed of the motor; a second output unit for outputting a second motor field current target value depending on the motor torque target value and the motor armature current; a third output unit for outputting a third motor field current target value depending on the motor armature current, the revolution speed of the motor and the supplied voltage; and a fourth output unit for outputting a fourth motor field current target value depending on the previous target value for the motor field current.

Further, according to this invention, there is provided a control apparatus for a vehicle wherein the rate of increase in the motor field current is kept equal to or lower than the rate of change in the supplied power.

Furthermore, according to this invention, there is provided a control apparatus for a vehicle wherein the electric power supply is a generator and the supplied voltage is the voltage generated by the generator.

A control apparatus for a vehicle according to this invention can quickly generate a required torque while suppressing the heat generation in the motor to the minimum, by controlling the motor field current in accordance with the supplied power and making the motor field current as large as possible within a range for which the required torque can be obtained, as a delay is caused in the change in the supplied power when the motor torque is changed in response to the insufficiency of power supplied from such an electric power supply as a generator or to the slip of the wheels driven by the electric motor. Thus, the control apparatus of this invention can keep the slip of the wheels driven by the electric motor within a small extent and therefore hill climbing performance on a slippery road can be improved. Also, as the maximum torque can be generated even when supplied power is insufficient, accelerating performance can be improved.

Other objects, features and advantages of the invention will become apparent from the following description of the embodiments of the invention taken in conjunction with the accompanying drawings.

BRIEF DESCRIPTION OF THE DRAWINGS

FIG. 6 is a table listing the conditions for judging the transition of control modes, for use with the 4WD controller as shown in FIG. 2a;

DESCRIPTION OF THE EMBODIMENTS

A control apparatus for a vehicle as a first embodiment of this invention will now be described with reference to the attached drawings.

Figure 1:
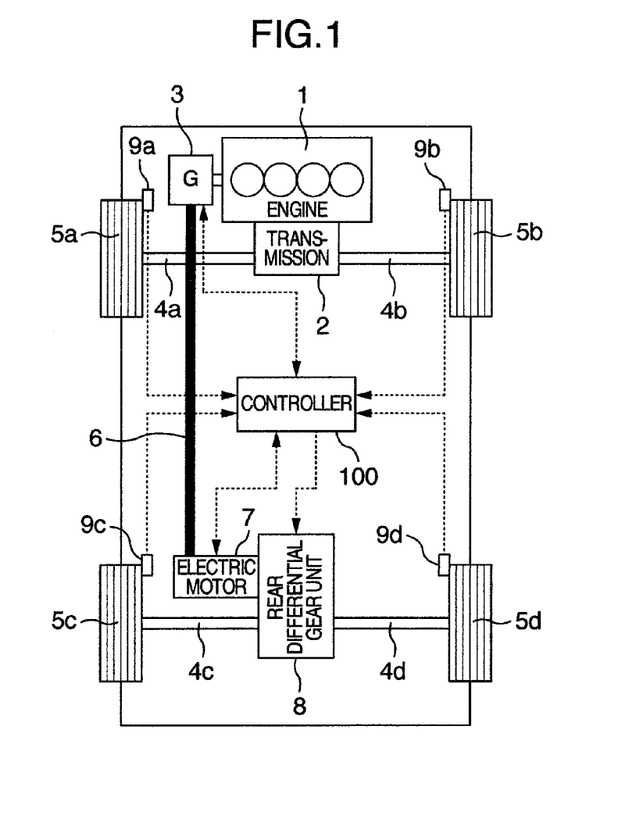
FIG. 1 shows a simplified structure of a vehicle to which a control apparatus as the embodiment of this invention is applied.

FIG. 1 shows a simplified structure of a vehicle (electric 4-wheel-drive vehicle) to which this invention is applied. The vehicle to which this invention has been applied has an engine 1, a transmission 2 and a generator 3, mounted thereon, and the mechanical power generated by the engine 1 is transmitted to the transmission 2 and the generator 3. The transmission 2, after being adjusted to a desired speed setting, transmits the mechanical power to the front axles 4a and 4b to drive the associated front wheels 5a and 5b, respectively. The mechanical power transmitted to the generator 3 is converted to electric power, which is supplied via a power line 6 to an electric motor 7. The electric motor 7 is a field-control DC motor which converts the supplied electric power into mechanical torque. The mechanical torque is then distributed, by means of a rear differential gear unit 8, to the rear axles 4c and 4d to drive the rear wheels 5c and 5d, respectively. Wheel speed sensors 9a, 9b, 9c and 9d are mounted near the front and rear wheels 5a, 5b, 5c and 5d, respectively. The wheel speed sensors detect the wheel speeds of the respective wheels. The vehicle to which this invention has been applied has a 4WD controller 100 mounted thereon. The 4WD controller 100 receives signals representing the corresponding wheel speeds from the wheel speed sensors 9a, 9b, 9c and 9d. These wheel speed signals are used to control the generator 3 and the electric motor 7.

Figure 2:
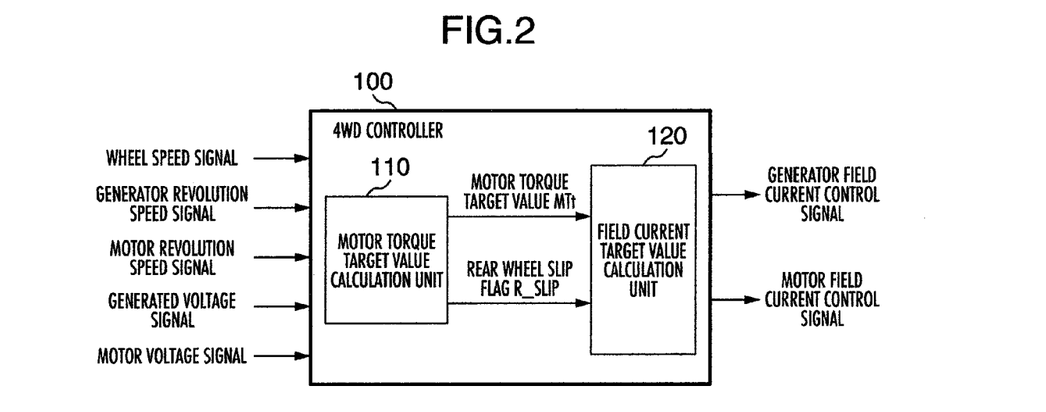
FIG. 2 shows in block diagram a 4WD controller as an embodiment of this invention.

FIG. 2 systematically shows in block diagram a 4WD controller as a first embodiment of this invention. The 4WD controller 100, as shown already in FIG. 1, comprises a motor torque target value calculation unit 110 and a field current target value calculation unit 120. The 4WD controller 100 receives as its inputs the wheel speed signals from the wheel speed sensors 9a, 9b, 9c and 9d, the generator revolution speed signal and the generator voltage signal from the generator 3, and the motor revolution speed signal and the motor voltage signal from the electric motor 7. The generator voltage signal and the motor voltage signal are the signals representing the armature voltages of the generator 3 and the motor 7, respectively. Further, the 4WD controller 100 delivers the generator field current control signal to the generator 3 and the motor field current control signal to the motor 7. Generally, the motor torque can be calculated as the product of the motor torque coefficient determined by the motor field current and the current flowing through the armature winding of the motor. Hence, the field-control DC motor can control the torque coefficient by controlling the field current of the motor. Accordingly, the 4WD controller 100 on one hand delivers the generator field current control signal, which controls the generated output of the generator 3, and on the other hand delivers the motor field current control signal, which controls the motor field current for controlling the torque of the motor 7.

The motor torque target value calculation unit 110 determines the motor torque target value MTt on the basis of the difference between the average VWF of the wheel speeds of the right and left front wheels and the average VWR of the wheel speeds of the right and left rear wheels. As the value obtained by subtracting the rear wheel speed average VWR from the front wheel speed average VWF becomes larger, the motor torque target value MTt is made larger accordingly. The motor torque target value calculation unit 110 incorporates therein a rear wheel slip detector, which sets a rear wheel slip flag R_SLIP when the rear wheels slip and unsets the rear wheel slip flag R_SLIP when the rear wheels stop slipping.

Figure 3:
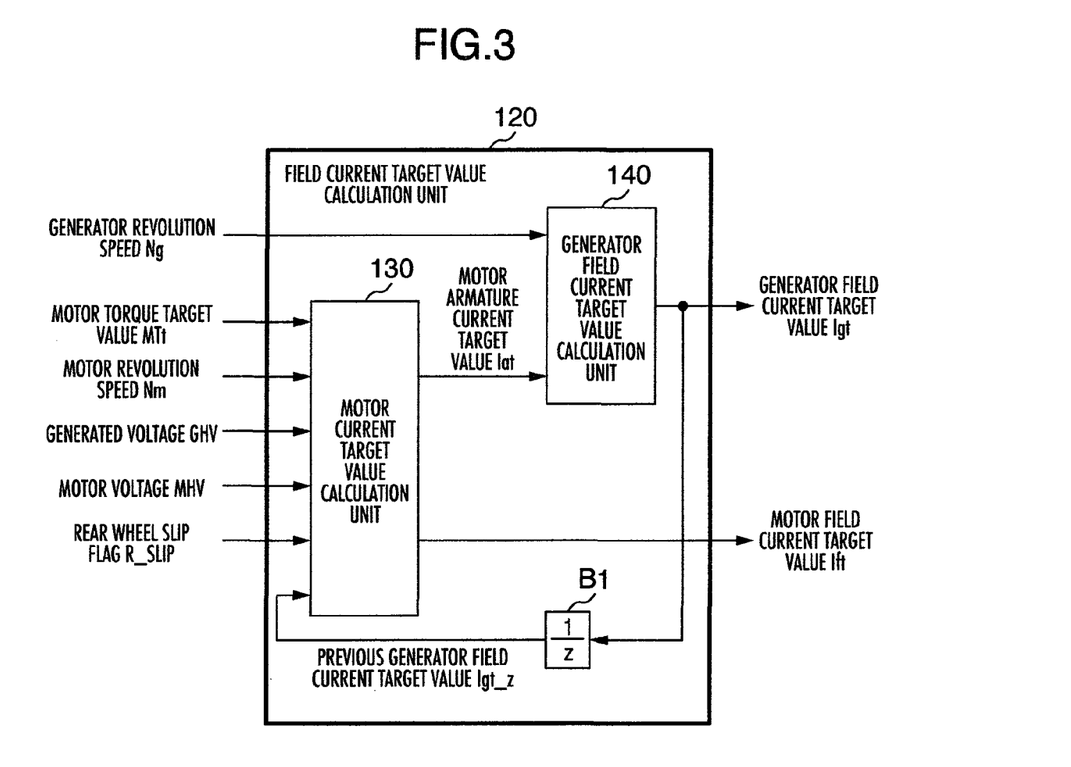
FIG. 3 shows in block diagram a field current target value calculation unit in the 4WD controller as shown in FIG. 2.

FIG. 3 shows in block diagram a field current target value calculation unit 120 in the 4WD controller as shown in FIG. 2.

The field current target value calculation unit 120 detects the delay of change in or the insufficiency of, the generated power depending on the generated voltage GHV. This unit 120 further controls the generator field current Ig and the motor field current If so that the motor 7 can produce the motor torque Tm adapted to the motor torque target value MTt by controlling the motor torque coefficient and the back electromotive force Em of the motor 7 through the control of the field current of the highly responsive motor 7 even when there is the delay of change in or the insufficiency of, the generated power.

As shown in FIG. 3, the field current target value calculation unit 120 comprises a motor current target value calculation unit 130, a generator field current target value calculation unit 140 and a sampling rate delay circuit B1. The motor current target value calculation unit 130 calculates the motor armature current target value Iat and the motor field current target value Ift from the motor torque target value MTt, the motor revolution speed Nm, the voltage GHV generated by the generator 3 (also referred to as generator voltage GHV), the motor voltage MHV, the rear wheel slip flag R_SLIP and the previous generator field current target value Igt_z. The structure of the motor current target value calculation unit 130 will be described later. The generator field current target value calculation unit 140 calculates the generator field current target value Igt from the generator revolution speed Ng and the motor armature current target value Iat by using a map. The sampling rate delay circuit B1 receives as its input the generator field current target value Igt and delivers as its output the previous generator field current target value Igt_z after a sampling period.

Figure 4:
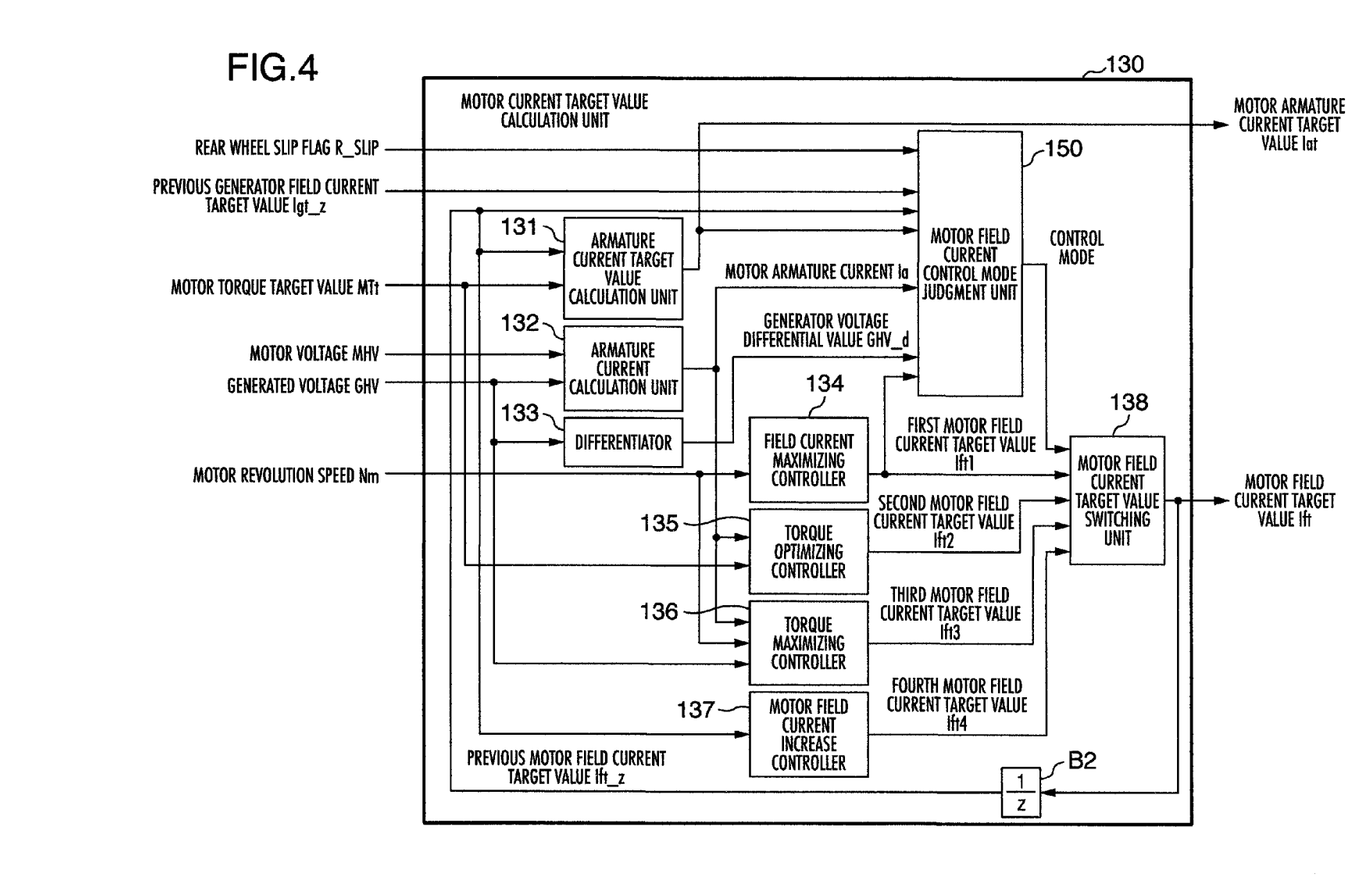
FIG. 4 shows in block diagram a motor current target value calculation unit in the 4WD controller as shown in FIG. 2.

FIG. 4 shows in block diagram the motor current target value calculation unit 130 shown in FIG. 3.

As shown in FIG. 4, the motor current target value calculation unit 130 incorporates therein an armature current target value calculation unit 131, an armature current calculation unit 132, a differentiator 133, a field current maximizing controller 134, a torque optimizing controller 135, a torque maximizing controller 136, a motor field current increase controller 137, a motor field current control mode judgment unit 150, a motor field current target value switching unit 138 and a sampling rate delay circuit B2.

The armature current target value calculation unit 131 calculates the motor armature current target value Iat from the previous motor field current target value Ift_z and the motor torque target value MTt by using a map. The armature current calculation unit 132 calculates the motor armature current Ia from the motor voltage MHV and the generator voltage GHV by using the following expression (1).

$$Ia = \frac{GHV - MHV}{R1} \quad (1)$$

, where R1 indicates the resistance value of the conductor (i.e. power line 6) connecting the generator 3 and the motor 7.

The differentiator 133 calculates the differential value GHV_d of the generator voltage GHV. The field current maximizing controller 134 calculates the first motor field current target value Ift1 from the motor revolution speed Nm by using a map. This map used by the field current maximizing controller 134 is that which is used to perform such weak field control as disclosed in the afore mentioned document JP-A-2005-186756.

The torque optimizing controller 135 calculates the motor torque coefficient target value KIf2 from the motor armature current Ia and the motor torque target value MTt by using the following expression (2).

$$KIf2 = \frac{MTt}{Ia} \quad (2)$$

The torque optimizing controller 135 also calculates the second motor field current target value Ift2p(not shown) before correction from the motor armature current Ia and the motor torque coefficient target value KIf2 by using a map. The torque optimizing controller 135 finally outputs as the second motor field current target value Ift2 the value obtained by adding a predetermined value c_Ift2 (not shown) to the second motor field current target value Ift2p(not shown) before correction. The predetermined value c_Ift2 is pre-adjusted in such a manner that the change in the supplied electric power can smoothly follow the increase in the field current of the motor 7.

The torque maximizing controller 136 calculates the motor torque coefficient target value Ift3 from the motor revolution speed Nm and the generator voltage GHV by using the following expression (3). In the expression (3), the coefficient C is the value obtained by dividing the back electromotive force Em of the motor by the motor torque coefficient determined on the basis of the motor revolution speed Nm and the motor field current. The coefficient C is a constant that should be previously obtained through calculation.

$$KIf3 = \frac{GHV}{2 \times C \times Nm} \quad (3)$$

The torque maximizing controller 136 calculates the third motor field current target value Ift3 from the motor armature current Ia and the motor torque coefficient target value Ift3 by using a map.

The motor field current increase controller 137 outputs as the fourth motor field current target value Ift4 the value obtained by adding the predetermined value c_Ift4 to the previous motor field current target value Ift_z. The predetermined value c_Ift2 is pre-adjusted in such a manner that the change in the supplied electric power can smoothly follow the increase in the field current of the motor 7.

The motor field current control mode judgment unit 150 decides on the control mode on the basis of the rear wheel slip flag R_SLIP, the previous generator field current target value Igt_z, the previous motor field current target value Ift_z, the motor armature current target value Iat, the motor armature current Ia, the generator voltage differential value GHV_d, and the first motor field current target value Ift1. The mode switching condition for the motor field current control mode judgment unit 150 will be described later.

The motor field current target value switching unit 138 outputs as the motor field current target value Ift one of the first motor field current target value Ift1, the second motor field current target value Ift2, the third motor field current target value Ift3 and the fourth motor field current target value Ift4 in accordance with the control mode determined by the motor field current control mode judgment unit 150. In order for the motor field current target value to be prevented from changing rapidly and largely, for example, when the third motor field current target value Ift3 is switched to the second motor field current target value Ift2, the change in the motor field current target value Ift may be smoothed by means of a low-pass filter or its rate may be so limited as to become less than a predetermined value by means of a rate limiter.

The sampling rate delay circuit B2 receives the motor field current target value Ift and delivers it as the previous motor field current target value Ift_z after a sampling period.

According to the above described procedure, the motor current target value calculation unit 130 calculates the motor armature current target value Iat and the motor field current target value Ift.

Figure 5:
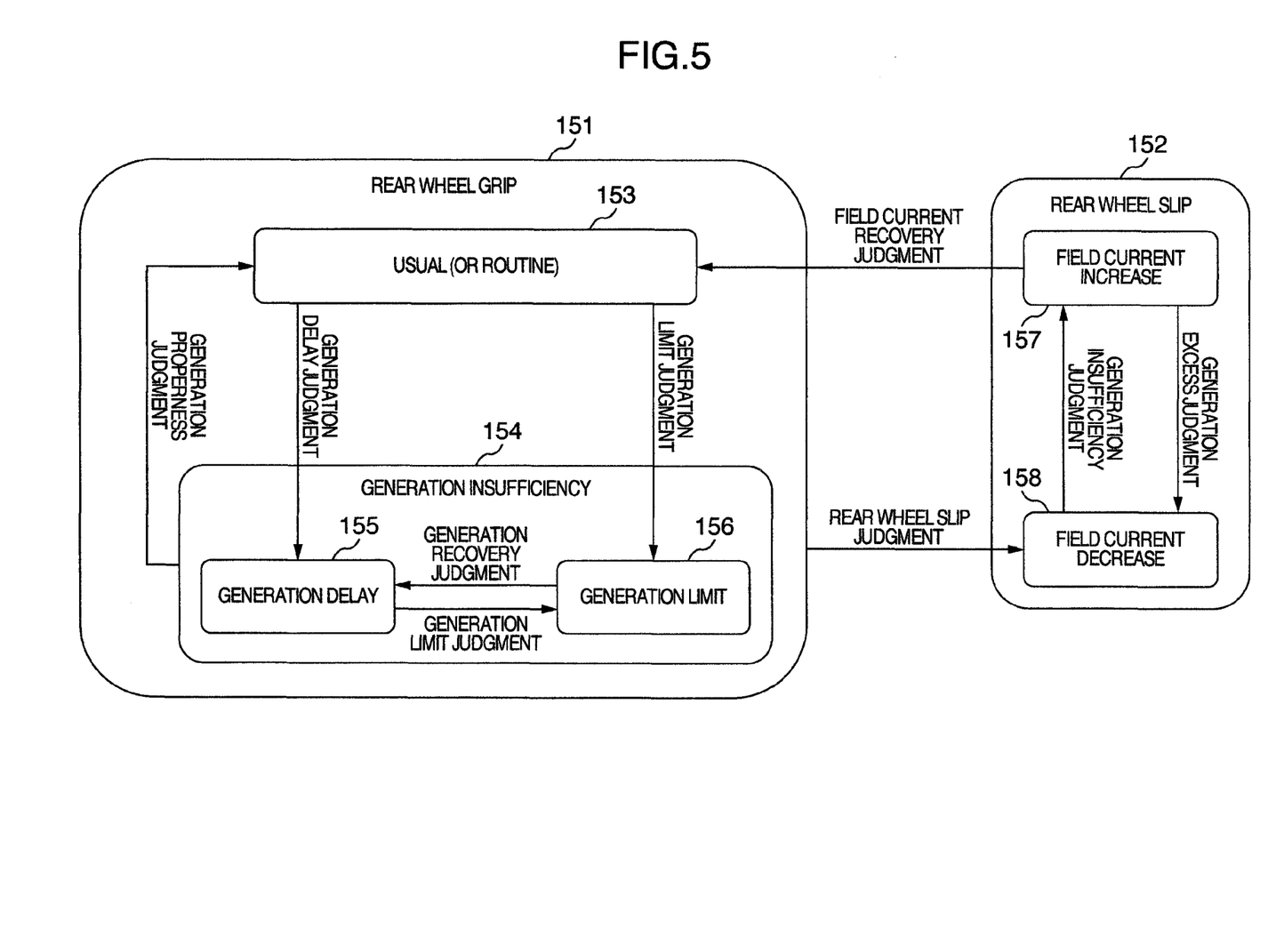
FIG. 5 is a mode transition diagram for a motor field current control mode judgment unit for use in the 4WD controller as shown in FIG. 2.

FIG. 5 is a mode transition diagram for the motor field current control mode judgment unit 150 for use in the 4WD controller as the first embodiment of this invention. The control mode is divided into the rear wheel grip mode 151 and the rear wheel slip mode 152. The rear wheel grip mode 151 consists of the usual (or normal) mode 153 and the generation insufficiency mode 154. The rear wheel slip mode 152 consists of the field current increasing mode 157 and the field current decreasing mode 158. The generation insufficiency mode 154 further consists of the generation delay mode 155 and the generation limiting mode 156.

The motor field current target value Ift as the output of the motor field current target value switching unit 138 assumes the first motor field current target value Ift1 in the usual (or normal) mode 153, the second motor field current target value Ift2 in the generation delay mode 155 and the field current decrease mode 158, the third motor field current target value Ift3 in the generation limiting mode 156, and the fourth motor field current target value Ift4 in the field current increasing mode 157.

Figure 6:
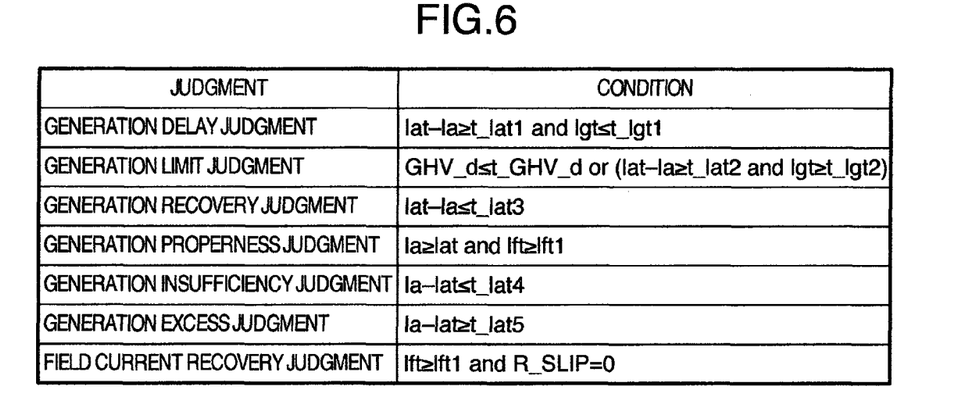

FIG. 6 is a table listing the conditions for judging the transition of control modes, for use with the 4WD controller as the first embodiment of this invention. Initially, the usual (or normal) mode 153 is started. In the usual (or normal) mode 153, if the difference between the motor armature current target value Iat and the motor armature current Ia is not smaller than a predetermined threshold t_Iat1 and if the generator field current target value Igt is not greater than a predetermined threshold t_Igt1, the judgment is of generation delay so that the transition from the usual (or normal) mode 153 to the generation delay mode 155 takes place. Also in the usual (or normal) mode 153, if the generator voltage differential value GHV_d is not greater than a predetermined threshold t_GHV_d, or if the difference between the motor armature current target value Iat and the motor armature current Ia is not smaller than a predetermined threshold t_Iat2 and if the generator field current target value Igt is not smaller than a predetermined threshold t_Igt2, then the judgment is of generation limit so that the transition from the usual (or normal) mode 153 to the generation limit mode 156 takes place. It is assumed here that the threshold t_Iat2 is greater than the threshold t_Iat1 and that the threshold t_Igt2 is greater than the threshold t_Igt1.

In the generation delay mode 155, if the judgment is of generation limit, the transition from the generation delay mode 155 to the generation limit mode 156 takes place. In the generation limit mode 156, if the difference between the motor armature current target value Iat and the motor armature current Ia is smaller than a predetermined threshold t_Iat3, the judgment is of generation recovery so that the transition from the generation limit mode 156 to the generation delay mode 155 takes place. In the generation insufficiency mode 154, if the motor armature current Ia is not smaller than the motor armature current target value Iat and if the motor field current target value Ift is not smaller than the first motor field current target value Ift1, then the judgment is of generation properness so that the transition from the generation insufficiency mode 154 to the usual (or normal) mode 153 takes place.

If the rear wheel slip flag R_SLIP is set, the transition from the rear wheel grip mode 151 to the field current decrease mode 158 in the rear wheel slip mode 152 takes place. In the field current decrease mode 158, if the difference between the motor armature current Ia and the motor armature current target value Iat is not greater than a predetermined threshold t_Iat4, the judgment is of generation insufficiency so that the transition from the field current decrease mode 158 to the field current increase mode 157 takes place. In the field current increase mode 157, if the difference between the motor armature current Ia and the motor armature current target value Iat is not smaller than a predetermined threshold t_Iat5, the judgment is of generation excess so that the transition from the field current increase mode 157 to the field current decrease mode 158 takes place. Also in the field current increase mode 157, if the motor field current target value Ift is not smaller than the first motor field current target value Ift1 and if the rear wheel slip flag R_SLIP has been unset (i.e. equal to zero), then the judgment is of field current recovery so that the transition from the field current increase mode 157 to the usual (or normal) mode 153 takes place.

As described above, the motor field current target value Ift can be determined by switching among the control modes.

The technical advantage of this invention will now be described with reference to FIGS. 7 through 10.

Figure 7:
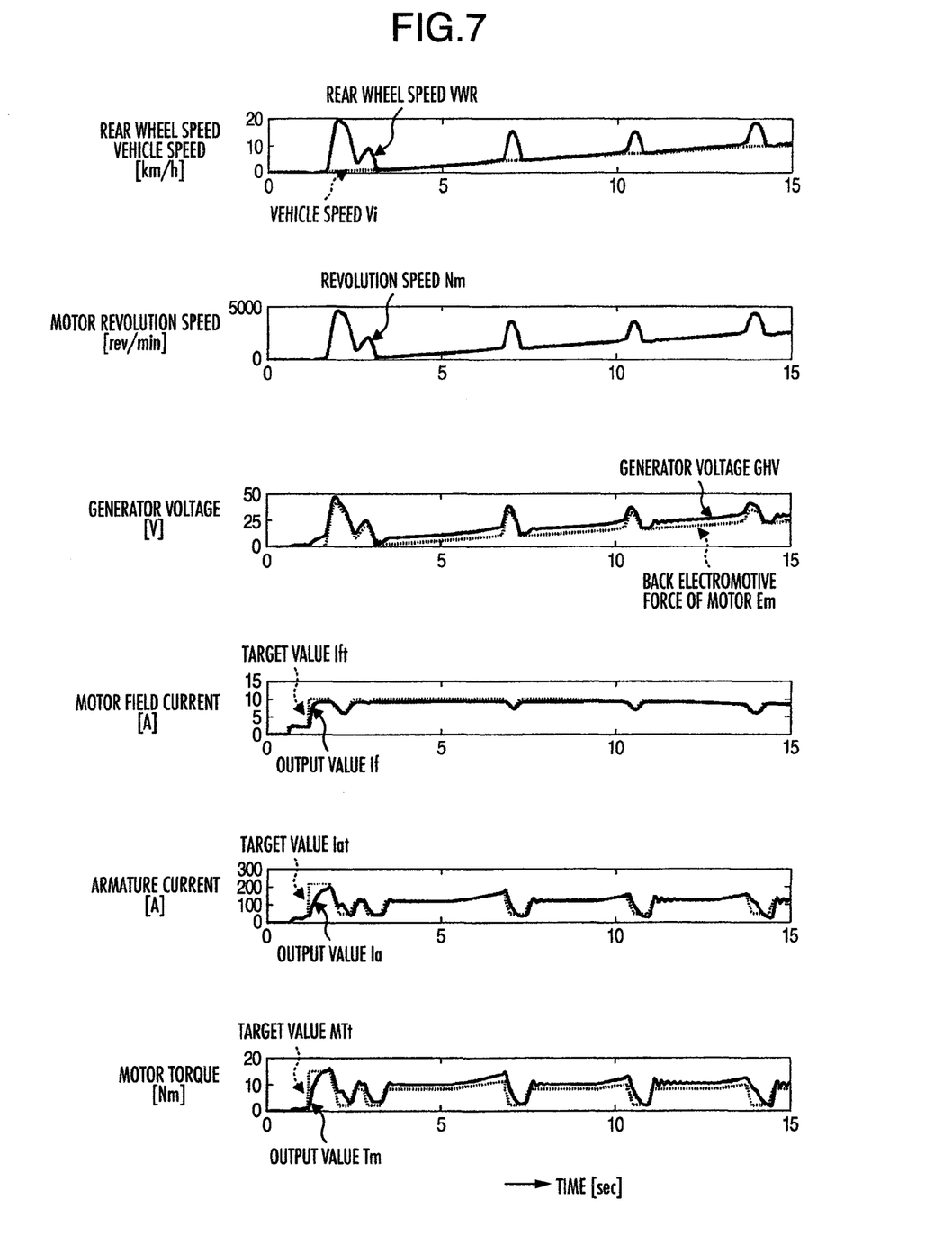
FIG. 7 graphically shows the results of test run along a slippery ascending slope of a vehicle with a conventional control apparatus mounted thereon.
Figure 8:
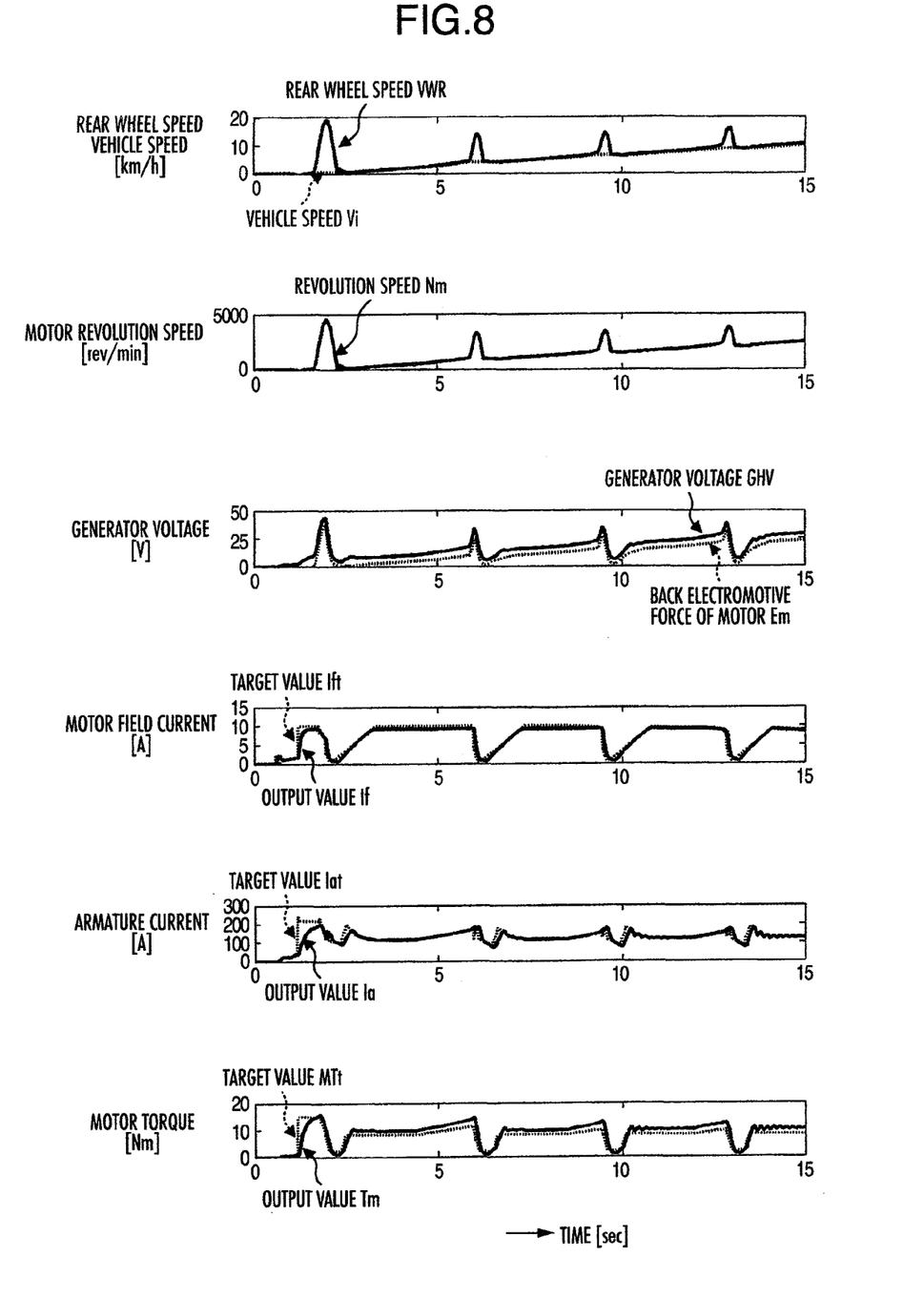
FIG. 8 graphically shows the results of test run along a slippery ascending slope of a vehicle with a control apparatus as shown in FIG. 2 mounted thereon.

FIGS. 7 and 8 graphically show the results of test runs along a slippery ascending slope of vehicles with a conventional control apparatus and a control apparatus as shown in FIG. 2 mounted thereon, respectively. FIG. 7 shows the results of test run of a vehicle with a control apparatus disclosed in JP-A-2005-186756 mounted thereon, and FIG. 8 shows the results of test run of a vehicle with a control apparatus according to this invention mounted thereon. Reference should be made to the graph representing the rear wheel speed VWR, which indicates that the rear wheels driven by the motor slip due to the low friction coefficient of the road surface. When the rear wheels slip, the motor torque target value MTt decreases to suppress the slip of the rear wheels. Accordingly, the power generated by the generator decreases to lower the generator voltage GHV. The depression of the generator voltage GHV causes the decrease in the motor armature current Ia so that the motor torque Tm decreases.

In FIG. 7, it is seen that as the decrease in the generator voltage is delayed, the decrease in the motor torque Tm is also delayed. In FIG. 8, on the other hand, the motor torque Tm is decreased without delay with respect to the motor torque target value MTt by decreasing the motor field current If to a great extent. As a result, the slip can be limited to a small extent. Also, when the generator voltage is lowered sufficiently, the motor field current If is increased accordingly so that excess current can be prevented from flowing through the motor armature, preventing the excess heating of the motor. As shown in FIG. 7, too, the motor field current If decreases to a small extent during the slip. This decrease, however, is simply caused by the decrease in the motor field current If as a result of the weak field control as disclosed in JP-A-2005-186756 due to the increase in the motor revolution speed Nm during the slip. The decrease does not make the motor torque Tm follow the motor torque target value MTt.

Figure 9:
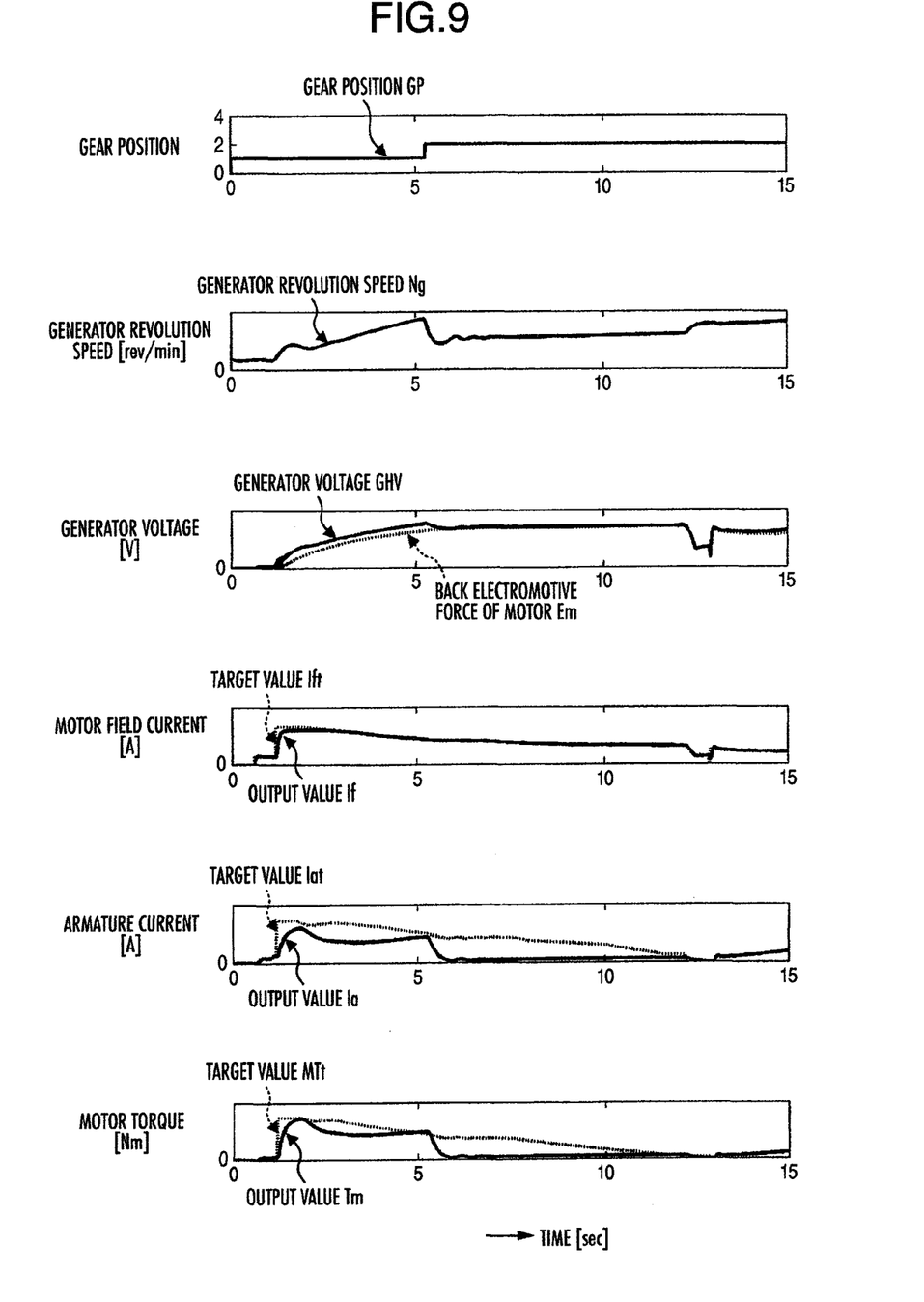
FIG. 9 graphically shows the results of test run along a frictional flat road of a vehicle with a conventional control apparatus mounted thereon.
Figure 10:
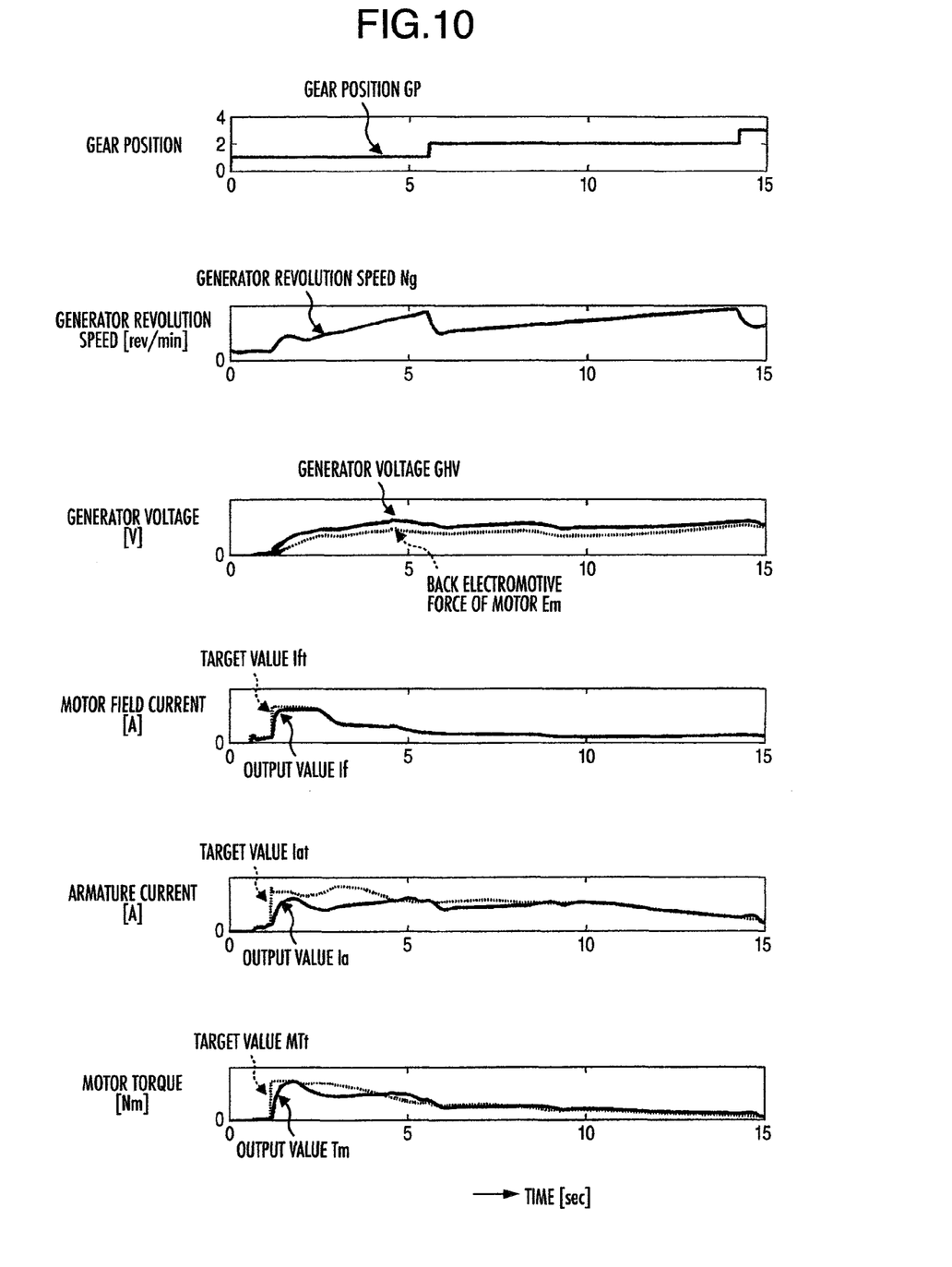
FIG. 10 graphically shows the results of test run along a frictional flat road of a vehicle with a control apparatus as shown in FIG. 2 mounted thereon.

FIGS. 9 and 10 graphically show the results of simulation test runs of a vehicle along a highly frictional, flat road. FIG. 9 shows the results of simulation test run along a frictional flat road of a vehicle with a conventional control apparatus as disclosed in JP-A-2005-186756 mounted thereon and FIG. 10 shows the results of simulation test run along a frictional flat road of a vehicle with a control apparatus according to this invention mounted thereon. The graphs representing the gear positions GP in both FIGS. 9 and 10 indicate that speed change takes place in a little more than 5 seconds. Accordingly, the generator revolution speed Ng decreases, resulting in the decrease in the power generation leading to the decrease in the generator voltage GHV. FIG. 9 shows the situation where the motor torque Tm cannot be generated since the armature current Ia is interrupted according as the difference between the generator voltage GHV and the back electromotive force Em of the motor vanishes after the speed change. As shown in FIG. 10, on the other hand, the motor field current If is decreased in response to the depression of the generator voltage GHV, the back electromotive force Em of the motor is accordingly decreased, and consequently the smooth motor torque Tm following the motor torque target value MTt can be generated. After the lapse of 10 seconds, the motor field current If is decreased in response to the increase in the generator voltage GHV. Accordingly, the armature current Ia is prevented from flowing excessively and the overheating of the motor is prevented.

From the result of the simulation described above, it is known that the control apparatus according to this invention can quickly develop a desired motor torque while preventing the overheating of the motor due to excess current flowing through the armature winding.

In the above described embodiment of this invention, description is made of a case where the front wheels $5a$ and $5b$ are driven by the engine 1 while the rear wheels $5c$ and $5d$ are driven by the electric motor 7. However, a variation may be possible wherein front wheels are driven by an electric motor and rear wheels are driven by an engine.

In the above described embodiment of this invention, the 4WD controller 100 serves as both the motor field current control unit and the electric power supply control unit and the generator 3 is used as the electric power supply. A variation may also be realized wherein a battery, a capacitor or a fuel cell is used as an electric power supply.

In the above described embodiment of this invention, the field-control DC motor is used as the motor 7 and the power generated by the generator is fed directly to the motor 7 via the power line 6. In a variation of this embodiment, a field-control AC motor may be used and this AC motor can be driven by means of an inverter connected between the power line and the AC motor.

In the above described embodiment of this invention, the motor torque target value calculation unit 110 is used which determines the motor torque in response to the difference between the front wheel speed and the rear wheel speed. In a modified embodiment, a motor torque target value setting unit may be used which receives an accelerator actuation signal to determine the torque of the motor 7 in accordance with the degree of the accelerator actuation.

In the above described embodiment of this invention, the motor field current control mode judgment unit 150 is used which detects the insufficiency of power generation on the basis of the generator voltage differential value GHV_d, the motor armature current target value Iat, and the motor armature current Ia. However, the insufficiency of power generation may be detected by judging from the generator revolution speed. Also, the insufficiency of power generation may be detected in view of the engine revolution speed, the wheel speed, the gear ratio of the transmission, or the front differential gear ratio.

In the above described embodiment of this invention, the motor torque coefficient target value is calculated from the generator voltage, the motor armature current and the motor revolution speed and then the motor field current is controlled through the calculation of the motor field current target value by using a map. Instead, a motor field current control unit may be used which gradually decreases the motor field current when the judgment of power insufficiency is made. Or a motor field current control unit may be used which controls the motor field current through the calculation of the motor field current target value by using a map on the basis of generator voltage, motor armature current, motor revolution speed and generator revolution speed.

In the above described embodiment of this invention, the predetermined thresholds c_Ift2 and c_Ift4 used by the motor field current increase controller 137 are so preset that the change in the supplied electric power can smoothly follow the increase in the field current of the motor 7. The thresholds c_Ift2 and c_Ift4, however, may be varied in response to the absolute value of the speed of the change in the supplied electric power. Or the thresholds c_Ift2 and c_Ift4 may be made greater according as the field current of the generator 3 becomes smaller.

In the above described embodiment of this invention, the motor field current control unit is used wherein the delay of the change in the generator voltage or the generation insufficiency is detected on the basis of the generator voltage, the motor armature current and the motor armature current target value and the overheating of the motor is prevented by increasing the motor field current according as the delay or the insufficiency is being recovered. However, a motor field current control unit may be used wherein the temperature of the motor is detected by a sensor and the overheating of the motor is prevented by increasing the motor field current when the motor temperature reaches a preset value. Alternatively, a motor field current control unit may be used wherein the motor field current is increased on the basis of the judgment that the electric resistance of the motor armature winding has increased due to the heat generation in the motor when the difference between the back electromotive force of the motor calculated from the motor voltage and the motor armature current and the back electromotive force of the motor calculated from the motor revolution speed and the motor field current, exceeds a preset threshold. Moreover, a motor field current control unit may be used wherein the motor field current is not decreased even when the motor temperature exceeds a preset threshold.

As described in relation to FIGS. 9 and 10, the embodiment of this invention can be advantageously used in the case where power generation becomes insufficient due to speed change. The control apparatus according to this invention can also be used in the case where an electric power supply also energizes another auxiliary device and the power supply becomes insufficient when power consumed by the auxiliary device increases. In such a case, a power distribution control unit may be used which restricts the power supply to the auxiliary device or preferentially supplies power to the motor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for a vehicle having an electric motor to drive wheels of the vehicle and an electric power supply to energize the electric motor, comprising a controller which temporarily decreases a field current of the motor when the difference between the actual motor armature current and the motor armature current target value exceeds a predetermined value, and which increases the field current of the motor when the difference between the actual armature current of the motor and the motor armature current target value does not exceed the predetermined value,
   wherein the controller further comprises a field current target value calculation means,
   wherein the field current target value calculation means comprises a motor current target value calculation means that comprises plural means for outputting different target values for the motor field current, a motor field current control mode judgment means, and a motor field current target value switching means, and
   wherein the motor field current target value switching means selectively outputs one of the different target values in accordance with the judgment result obtained by the motor field current control mode judgment means.

2. A control apparatus as claimed in claim 1, wherein said plural means for outputting different target values produce and output a plurality of target values for the motor field current based on an input which is selected among a revolution speed of the motor, an armature current of the motor, a motor torque target value, a supply voltage and a previous motor field current target value.

3. A control apparatus as claimed in claim 1, wherein said plural means for outputting different target values further comprises:
   means for outputting a first target value for the motor field current based on the revolution speed of the motor;
   means for outputting a second target value for the motor field current based on the motor torque target value and the armature current of the motor;
   means for outputting a third target value for the motor field current based on the armature current of the motor, the revolution speed of the motor and the supply voltage; and
   means for outputting a fourth target value for the motor field current based on the previous motor field current target value.

4. A control apparatus as claimed in claim 1, wherein said electric power supply is a generator which produces a supply voltage supplied to the motor.

5. A control apparatus for a vehicle having an electric motor to drive wheels of the vehicle and an electric power supply to energize the electric motor, comprising a control means which temporarily decreases a field current of the motor when the front wheels slip, and which increases the field current of the motor when the difference between the actual armature current of the motor and the motor armature current target value does not exceed a predetermined value,
   wherein the controller further comprises a field current target value calculation means,
   wherein the field current target value calculation means comprises a motor current target value calculation means that comprises plural means for outputting different target values for the motor field current, a motor field current control mode judgment means, and a motor field current target value switching means, and
   wherein the motor field current target value switching means selectively outputs one of the different target values in accordance with the judgment result obtained by the motor field current control mode judgment means.

6. A control apparatus as claimed in claim 5, wherein said plural means for outputting different target values produce and output a plurality of target values for the motor field current based on an input which is selected among a revolution speed of the motor, an armature current of the motor, a motor torque target value, a supply voltage and a previous motor field current target value.

7. A control apparatus as claimed in claim 5, wherein said plural means for outputting different target values further comprises:
   means for outputting a first target value for the motor field current based on the revolution speed of the motor;
   means for outputting a second target value for the motor field current based on the motor torque target value and the armature current of the motor;
   means for outputting a third target value for the motor field current based on the armature current of the motor, the revolution speed of the motor and the supply voltage; and
   means for outputting a fourth target value for the motor field current based on the previous motor field current target value.

8. A control apparatus as claimed in claim 4, wherein said electric power supply is a generator which produces a supply voltage supplied to the motor.

9. A control apparatus for a vehicle having an electric motor to drive wheels of the vehicle and an electric power supply to energize the electric motor, comprising a controller which temporarily decreases a field current of the motor when the difference between the actual motor armature current and the motor armature current target value exceeds a predetermined value, and which increases the field current of the motor when the difference between the actual armature current of the motor and the motor armature current target value does not exceed the predetermined value, wherein a rate of increase in the motor field current is kept equal to or lower than a rate of change in a supplied power.

10. A control apparatus for a vehicle having an electric motor to drive wheels of the vehicle and an electric power supply to energize the electric motor, comprising a control means which temporarily decreases a field current of the motor when the front wheels slip, and which increases the field current of the motor when the difference between the actual armature current of the motor and the motor armature current target value does not exceed a predetermined value, wherein a rate of increase in the motor field current is kept equal to or lower than a rate of change in a supplied power.

* * * * *